United States Patent [19]
McDonald

[11] 3,850,023
[45] Nov. 26, 1974

[54] SCALE CALIBRATION MONITORING DEVICE

[75] Inventor: Ralph R. McDonald, Carlsbad, N. Mex.

[73] Assignee: Commerce Bank and Trust Bank, Eddy County, N. Mex.

[22] Filed: Aug. 20, 1973

[21] Appl. No.: 389,437

[52] U.S. Cl. .......................... 73/1 B, 177/1, 177/50
[51] Int. Cl. .. G01c 25/00, G01g 19/52, G01g 23/00
[58] Field of Search ............. 73/1 B, 1 R; 177/1, 50, 177/119, 164, 151–153, 210, 211

[56] References Cited
UNITED STATES PATENTS
3,656,337  4/1972  McDonald............................ 73/1 B Primary Examiner—Donald O. Woodiel
Attorney, Agent, or Firm—Clarence A. O'Brien & Harvey B. Jacobson

[57] ABSTRACT

A pivoted scale beam is displaced by loads on a conveyor to register weight through a pair of load cells connected to a weight readout system. The readout system is corrected automatically in response to variations in the readout of reference weights sensed by the load cells during test intervals while the load of the conveyor is removed from the scale beam by a pivoted idler beam from which the reference weights are suspended.

14 Claims, 13 Drawing Figures

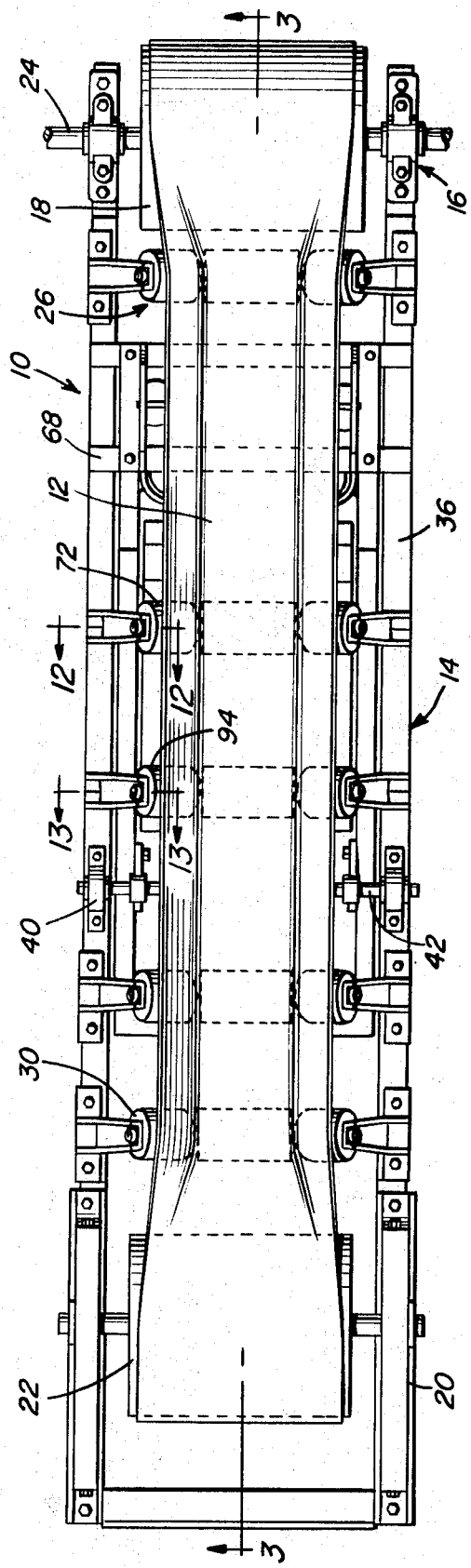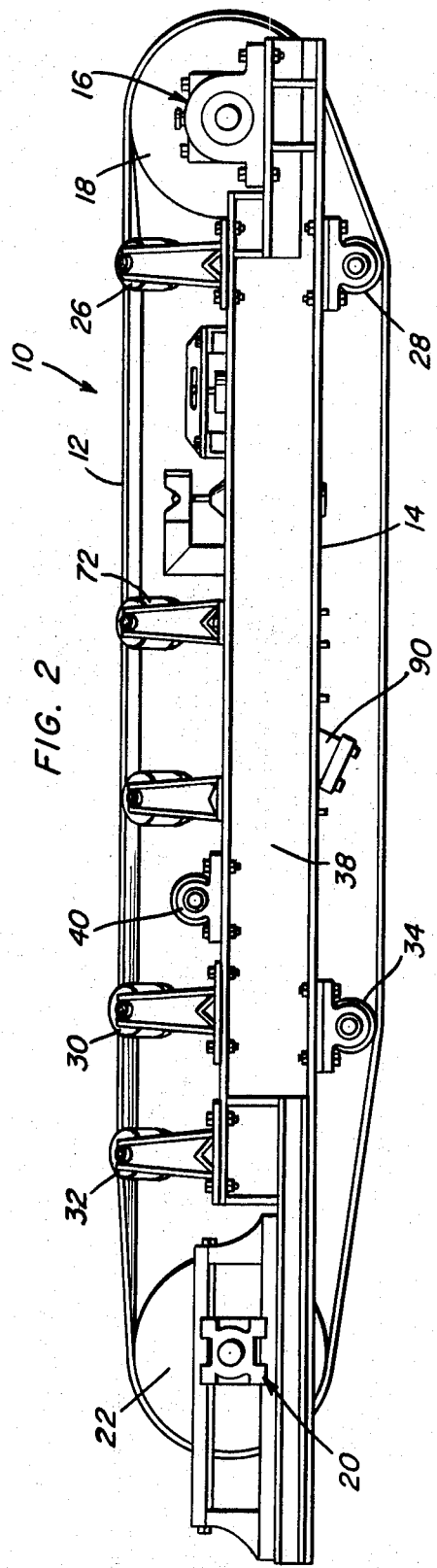

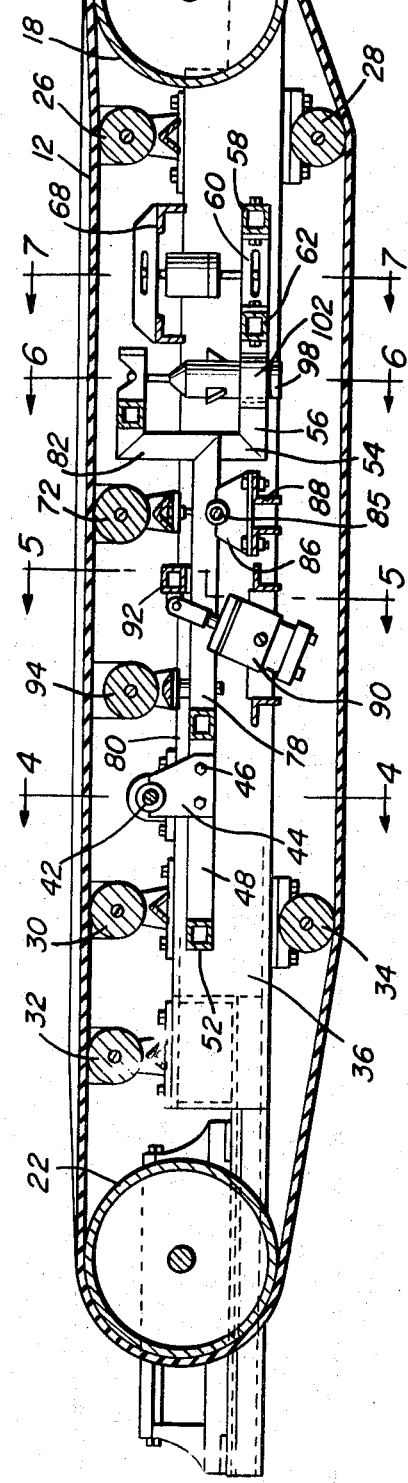

SCALE CALIBRATION MONITORING DEVICE

This invention relates to the monitoring and automatic correction of weight sensing systems for articles or materials transported on continuously moving conveyors, and embodies improvements over my prior U.S. Pat. No. 3,656,337, issued Apr. 18, 1972.

In the weight sensing system disclosed in my prior patent aforementioned, certain errors in the weight registered occurred despite the intermittent recalibration and correction of the weight readout system. These errors are attributable to uneven distribution of loads on the conveyor both transverse to the direction of conveyor travel and in the direction of conveyor travel. The total weight of asymmetric loads on the conveyor, could not for example be accurately sensed by the single load cell arrangement disclosed in my prior U.S. patent because of lateral deflection of the pivoted scale beam. It has also been found, that uneven distribution of loads along the conveyor in the direction of travel, causes momentary variations in conveyor speed from an optimum reference value at which accurate weight measurements are made, also resulting in certain errors in the weight registered by the readout system. Other errors have also been caused by variations in the weight of the conveyor belt itself as it moves past the weighing station. Accordingly, it is an important object of the present invention to provide an improved weight sensing system capable of eliminating the aforementioned error producing defects in the system disclosed in my prior U.S. patent.

In accordance with the present invention, the total weight of an article or load on a conveyor is correctly sensed despite any lateral distortion of the pivoted scale beam by asymmetric loading of the conveyor belt, through use of a pair of load cells transversely spaced from each other relative to the direction of conveyor travel. These load cells are adapted to be anchored to the frame of the weighing device so as to be tensioned by the end of the pivoted scale beam when downwardly displaced by the loaded conveyor belt. The outputs of both load cells are accordingly summed within the weight readout system in order to produce a correct weight sensing signal. The load of the conveyor is removed from the pivoted scale beam during test intervals by a pivoted idler beam which is also provided with a corresponding pair of reference weights suspended therefrom for engagement with the scale beam. In utilizing a pair of reference weights, it is essential that the reference weight be laterally aligned parallel to the load cells during the test intervals. Toward that end, the scale beam may be pivotally mounted by a universal joint with counter-balancing weights arranged to laterally rebalance the scale beam during the test intervals following any lateral deflection that may be imparted to the scale beam by asymmetrical loading of the conveyor belt between test intervals.

Also, in one embodiment of the invention, a variable speed drive may be provided for the conveyor so that the speed of the conveyor belt may be corrected in response to deviation from an optimum speed at which material travels past the weighing station. In yet another embodiment of the invention, an unloaded portion of the conveyor belt is sensed by an additional weighing device so as to subtract the instantaneous weight of the conveyor belt from the value of the weight being sensed by the primary weighing device.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of a conveyor and recalibrating weighing system constructed in accordance with the present invention.

FIG. 2 is a side elevational view of the apparatus shown in FIG. 1.

FIG. 3 is a side sectional view taken substantially through a plane indicated by section line 3—3 in FIG. 1.

FIGS. 4, 5, 6 and 7 are transverse sectional views taken substantially through planes indicated by section lines 4—4, 5—5, 6—6 and 7—7 in FIG. 3.

Figure 8:
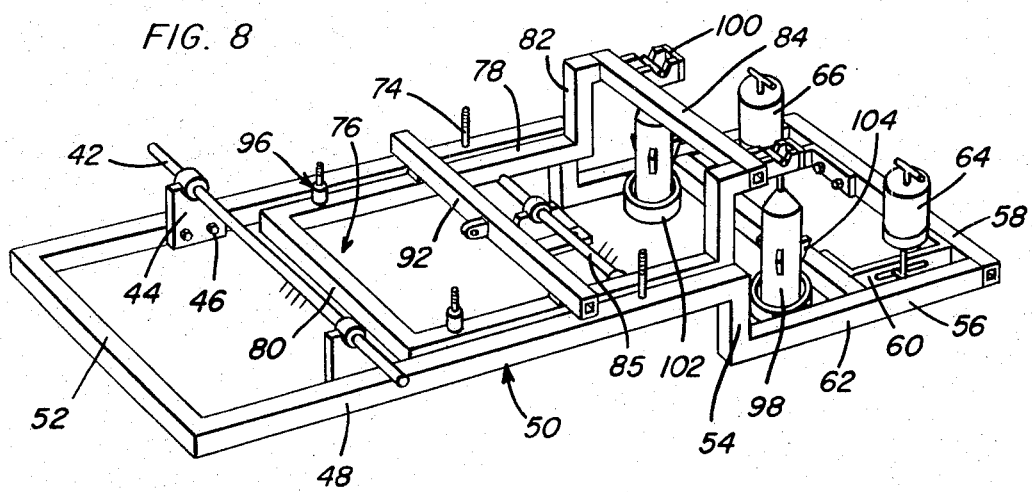

FIG. 8 is a perspective view showing the scale beam and idler beam assemblies.

Figure 9:
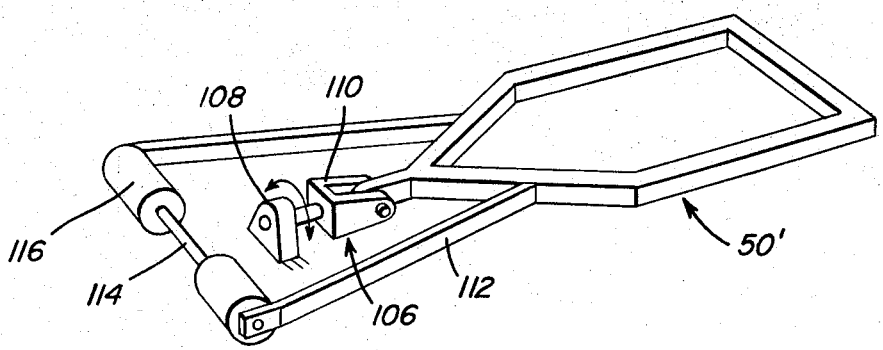

FIG. 9 is a perspective view showing a modified form of scale beam assembly.

Figure 10:
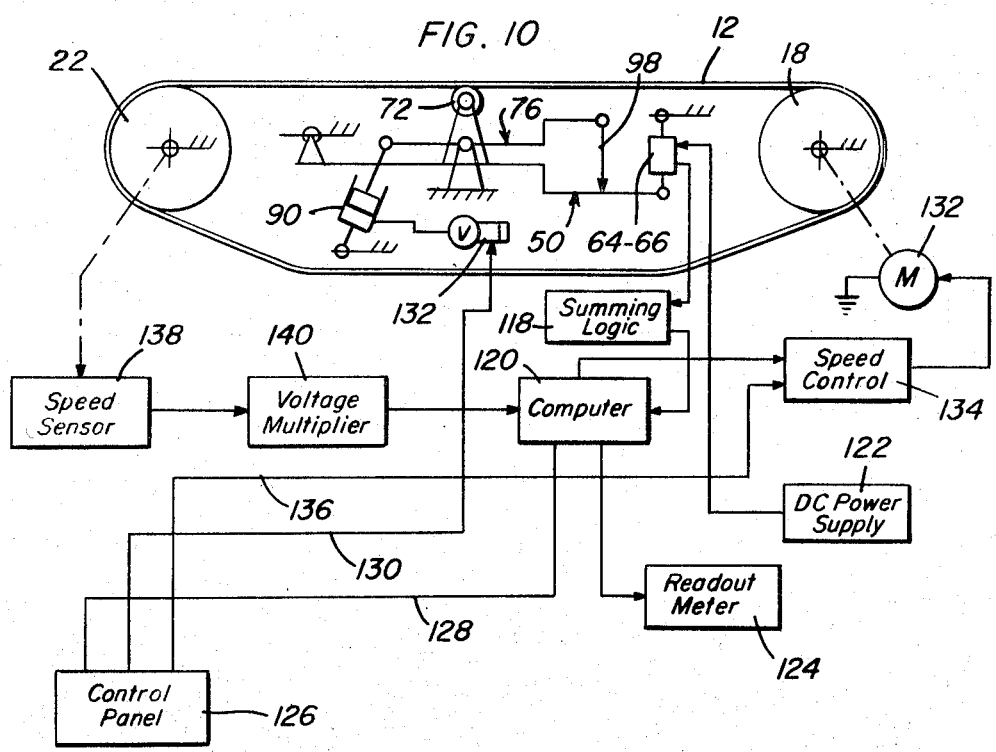

FIG. 10 is a schematic view illustrating the system of the present invention with respect to a variable conveyor speed embodiment.

Figure 11:
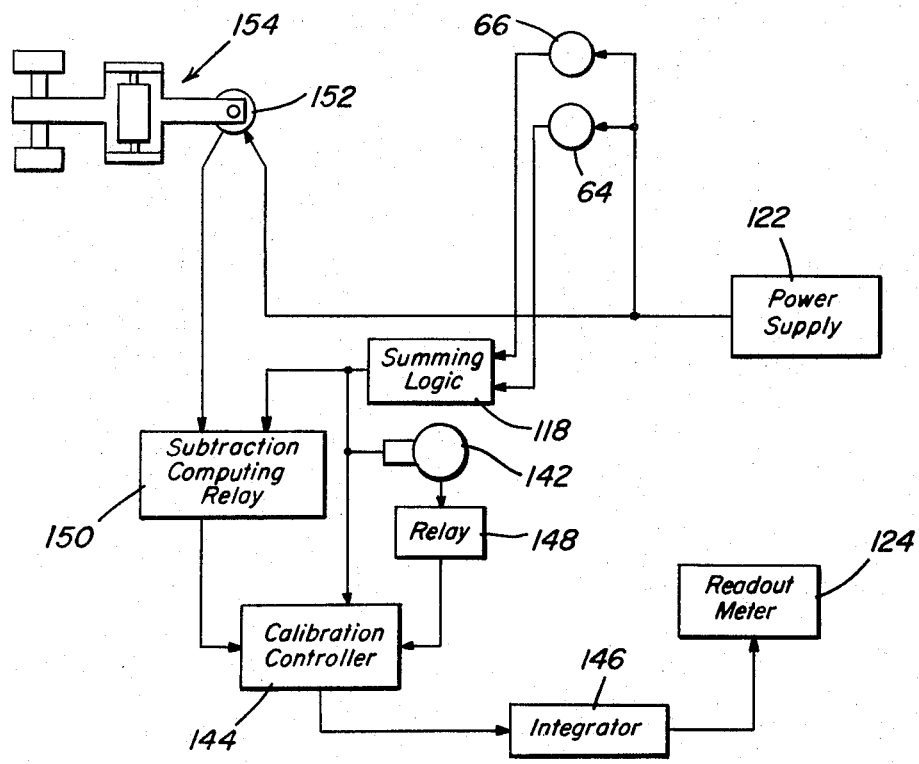

FIG. 11 is a schematic view illustrating a constant conveyor speed embodiment of the present invention.

Figure 12:
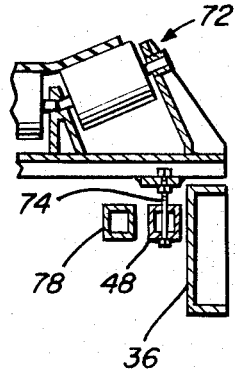
Figure 13:
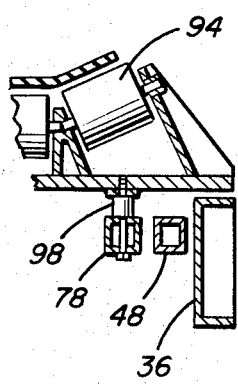

FIGS. 12 and 13 are partial sectional views taken substantially through planes indicated by section lines 12—12 and 13—13 in FIG. 1.

Referring now to the drawings in detail, and initially to FIGS. 1 and 2, the apparatus of the present invention generally denoted by reference numeral 10 is shown associated with a continuously driven conveyor belt 12 of the endless, flexible type. The apparatus 10 includes an elongated stationary frame assembly generally referred to by reference numeral 14. A pair of bearing assemblies 16 are mounted by the frame assembly adjacent one longitudinal end for rotatably mounting a drive roller 18 about which the conveyor belt 12 is entrained. A pair of bearing assemblies 20 are adjustably mounted adjacent the other longitudinal end of the frame assembly for rotatably mounting a roller 22 about which the conveyor belt is also entrained. The tension of the conveyor belt is adjusted by means of the positioning of the bearing assemblies 20 on the frame while drive is imparted to the conveyor belt through the drive roller 18 having its drive shaft 24 connected to a suitable drive mechanism or source of motive power. Support roller assemblies 26, 30 and 32 are secured to the top of the frame assembly in longitudinally spaced relationship to each other for supporting the upper run of the conveyor belt. A pair of roller assemblies 28 and 34 are secured to the bottom of the frame assembly adjacent the longitudinal ends for engagement with the lower run of the conveyor belt. All of the latter belt supporting roller assemblies, are secured to and extend between channel-shaped, parallel spaced side frame members 36 of the frame assembly.

Also mounted on top of the side frame members 36 between the belt supporting roller assemblies 30 and 28, are a pair of bearing assemblies 40 between which a pivot shaft 42 is journaled. As more clearly seen in FIGS. 3, 4 and 8, a pair of laterally spaced connecting brackets 44 are secured to the pivot shaft 42 and extend downwardly therefrom between the side frame members 36. The connecting brackets 44 are secured by fasteners 46 to the side frame portions 48 of a scale beam generally referred to by reference numeral 50. The side frame members 48 of the scale beam extending on one side of the pivot shaft 42 are interconnected at the ends by an end frame member 52. The side frame members 48 on the other side of the pivot shaft 42 are interconnected by downwardly extending portions 54 to side sections 56 interconnected at the remote ends by an end frame member 58. A pair of laterally spaced, slotted straps 60 are interconnected between the frame member 58 at the end of the side frame sections 56 and a cross frame member 62 longitudinally spaced therefrom. A pair of load cells 64 and 66 are pivotally interconnected to the scale beam 50 by means of the side sections 56 and the slotted strap members 60 as more clearly seen in FIGS. 7 and 8. Each of the load cells is pivotally suspended from the frame assembly. Toward this end, a pair of angle frame members 68 extend across the tops of the side frame members 36 adjacent to the support roller assembly 26 as more clearly seen in FIG. 3, a pair of slotted members 70 bridging the cross frame members 68 in overlying relation to each of the load cells for pivotally anchoring the same to the frame assembly as more clearly seen in FIGS. 3 and 7. The scale beam 50 is pivotally displaced in a clockwise direction about its pivot shaft 42 as viewed in FIGS. 3 and 8 in order to tension the load cells 64 and 66 by a load on the conveyor applied through a roller assembly 72 which is secured to the side frame members 48 of the scale beam by means of fastener assemblies 74 as more clearly seen in FIG. 12. The belt engaging roller assembly 72 is secured to the scale beam at a location between the belt supporting roller assemblies 26 and 30.

Referring now to FIGS. 3 and 8 once again, an idler beam 76 is constructed from a pair of side frame members 78 interconnected at one end by the end frame members 80. The opposite ends of the side frame members 78 are interconnected with upwardly extending portions 82 interconnected by end frame member 84 at an end of the idler beam opposite the end frame member 80. The idler beam is pivotally mounted on the frame assembly intermediate its longitudinal ends by a pivot shaft 85 extending between the side frame members 78. Pivot bearing brackets 86 are secured in laterally spaced relationship to each other to the pivot shaft 85 and are secured to the frame assembly by a pair of angle shaped, cross frame members 88 interconnected between the side frame members 36 as more clearly seen in FIG. 3. The pivot shaft 85 is located in underlying relation to the roller assembly 72 through which the scale beam 50 engages the upper run of the conveyor belt. The idler beam is pivotally displaced about its pivot shaft 85 in a clockwise direction as viewed in FIGS. 3 and 8 by means of a fluid power operated piston device 90 pivotally mounted between the side frame members 36 as more clearly seen in FIGS. 3 and 5. A piston rod extends upwardly from the piston device 90 and is pivotally connected to the idler beam 76 for pivotal displacement thereof by means of a crossbar 92. A belt engaging roller assembly 94 similar to those mounted on the frame assembly 14 and on the scale beam 50, is secured to the idler beam adjacent to the end frame member 80 by means of fastener assemblies 96 as more clearly seen in FIG. 13. Thus, when the idler beam is angularly displaced by the piston device 90 in a clockwise direction, the roller assembly 94 upwardly displaces the conveyor belt in order to remove its load from the scale beam 50. At the same time, a pair of reference weights 98 suspended from the end of the idler beam adjacent the end frame member 84, are lowered into engagement with the scale beam in order to load the scale beam while the load of the conveyor is removed therefrom. Suspension hooks 100 therefore extend from the end of the idler beam in laterally spaced relationship to each other and in overlying alignment with rings 102 secured to the side frame sections 56 of the scale beam as more clearly seen in FIGS. 6 and 8. The reference weights 102 slidably extend through the rings 102 which are engaged by the radial projections 104 mounted on the reference weights. The load of the reference weights is thereby transferred to the scale beam when the idler beam is angularly displaced by the piston device 90 in a clockwise direction as aforementioned.

A pair of load cells 64 and 66, rather than a single load cell, are provided so that the sum of the weight sensing signals derived therefrom will provide an accurate measurement of the load on the conveyor belt which may be asymmetrically distributed in a lateral direction thereby causing some lateral distortion of the scale beam as it is pivotally deflected by the load applied thereto through the roller assembly 72. The reference weights 98 will be aligned with the load cells so that load cells may also sense the two reference weights during test intervals when the load on the conveyor is removed from the scale beam by pivotal displacement of the idler beam as aforementioned. It will of course be appreciated, that the foregoing operation of the scale beam and idler beam requires that their pivotal axes extending through the pivot shafts 42 and 84, be parallel and perpendicular to the direction of conveyor travel and that this relationship also exist between the reference weights 98 and the load cells. However, because of the asymmetrical loading of the conveyor belt and the resulting lateral distortion of the scale beam, certain errors are introduced after continued use of the weighing system. In order to cope with this problem, a modified type of scale beam 50' is proposed as shown in FIG. 9. Instead of pivotally mounting the scale beam on the frame assembly about a single fixed axis, a universal pivot mounting assembly 106 is utilized including a stationary bearing 108 rotatably mounting a pivot bracket 110 about an axis parallel to the direction of travel of the conveyor, the scale beam itself being pivotally mounted by the bracket 110 about an axis perpendicular to the first mentioned axis and transverse to the direction of travel of the conveyor. A pair of arms 112 extend rearwardly from the scale beam and are interconnected by a rod 114 on which a pair of transversely spaced counterweights 116 are adjustably positioned. The counterweights 116 are therefore operative to establish and maintain lateral balance of the scale beam 50' relative to the axis parallel to the direction of conveyor travel about which axis the scale beam may tilt in response to asymmetrical loading. Lateral tilt of the scale beam may therefore occur while the conveyor load is being measured but the scale beam will be rebalanced during the test intervals while the load of the reference weights is applied thereto.

In accordance with the present invention, the output signals of the load cells 64 and 66 are added through a summing logic 118 as diagrammatically shown in FIG. 10 in order to supply a signal input to a weight readout system similar to that disclosed in my prior U.S. patent aforementioned. The readout system includes signal processing components denoted by 120 in FIG. 10, receiving an analog input signal developed from the load cells to which a dc power supply 122 is connected in order to measure the weight of the load that is registered through a readout meter 124. The system is self-correcting or operative to recalibrate itself in response to variations in the weight sensed during the intermittent test intervals as disclosed in my prior U.S. patent aforementioned. The timing of the test intervals may be selected through a control panel 126 connected to the computer system 120 by a relay 128 that is operative to maintain a constant conveyor speed during the test interval when calibration of the weighing device is being checked. The control panel 126 is also connected by line 130 as shown in FIG. 10 to the solenoid operated valve control 132 for effecting a test operation by pivotal displacement of the idler beam 76 by means of the piston device 90. Except for the use of two load cells in order to obtain an analog input representing the weight being sensed, the operation of the weighing and calibrating system so far described with respect to FIG. 10, is the same as that disclosed in my prior U.S. patent aforementioned.

In FIG. 10, the weighing and calibrating system illustrated is associated with a variable speed drive for the conveyor in the form of a variable speed motor 132 drivingly connected to the drive roller 18. A speed control component 134 varies the speed of the drive motor between test intervals whenever its speed deviates from an optimum value under which a weighing operation occurs. This optimum speed value may be preset from the control panel through control line 136 to the speed control component 134 to which an output of the computer 120 is connected. A speed sensing input is therefore fed to the computer from a speed sensor component 138 through a voltage multiplier 140. The speed sensor 138 is driven from the roller 22 of the conveyor at an end remote from the drive roller 18 for this purpose.

Figure 7:
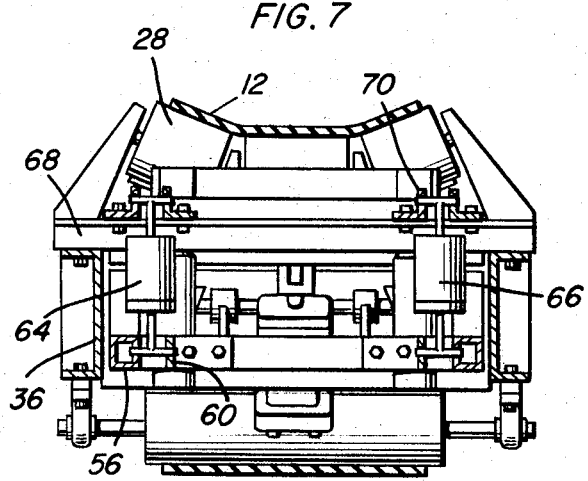

FIG. 11 illustrates a weighing and calibration system similar to that described with respect to FIG. 10 except that it is associated with a conveyor that is driven at a constant speed. Thus, the output of the load cells 64 and 66 as shown in FIG. 7 is applied to the summing logic 118 from which a more accurate output reflecting the weight of the load is obtained and applied to a calibration control motor assembly 142 and to a calibration controller component 144 as described in my prior U.S. patent aforementioned. The output of the controller 144 is processed by an integrator 146 in order to obtain a readout through the meter 124. Variations in the weight sensed during the test intervals are corrected by the calibration control motor 142 through the relay 148. Further correction is, however, made in accordance with the system depicted in FIG. 11 by means of a subtraction computing relay 150 to which the output of the summing logic 118 is also applied. The computing relay 150 thus compares the total load detected by the weighing system and the load of the conveyor belt itself sensed by another load cell 152 associated with another scale beam weighing device 154 operatively positioned along an unloaded portion of the conveyor belt. It will therefore be appreciated, that instantaneous variations in the weight of the conveyor belt itself which could introduce errors in the actual measured weight of the load on the conveyor, will be corrected through the computing relay 150.

It will be apparent from the foregoing description, that the apparatus and system of the present invention in addition to providing for intermittent recalibration of the weighing device will also compensate for uneven lateral distribution of the load on the conveyor by summing the output of a plurality of transversely spaced load cells through which the load applied to the scale beam is measured. Also, the error producing effect of uneven distribution of load on the conveyor in the direction of travel may be dealt with by varying the driving speed of the conveyor in accordance with deviations from an optimum preset speed as sensed at a location spaced from the driving end of the conveyor. Alternatively, the conveyor may be driven at a constant speed and the weight of an empty portion of the conveyor measured in order to provide a corrective signal to the system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a continuously moving conveyor on which material travels in one direction past a weighing station at which a weighing device is in engagement with the conveyor for sensing the weight of said material, a system for calibrating the weighing device comprising test means for displacing the conveyor out of engagement with the weighing device during test intervals, reference means responsive to said displacement of the weighing device for loading the same, adjusting means for correcting readout of the weighing device in response to variations in weight sensed during said test intervals, and means connected to the weighing device for correcting readout of the weighing device in response to asymmetrical loading of the conveyor.

2. The combination of claim 1 wherein said weighing device includes a pivoted scale beam, load applying means mounted on the scale beam for engagement with the conveyor, a pair of load sensing devices connected to the scale beam at laterally spaced locations relative to said direction of travel of the conveyor for producing signals in response to displacement of the scale beam, and readout means connected to the load sensing devices for registering the weight of the material.

3. The combination of claim 2 wherein said reference means comprises a pair of reference weights engageable with the scale beam, and means suspending the reference weights from the test means in substantial alignment with the load sensing devices.

4. The combination of claim 3 wherein said test means comprises an idler beam, and means pivotally mounting the idler beam about an axis transverse to said direction of travel of the conveyor underlying the load applying means of the weighing device.

5. The combination of claim 4 including means pivotally mounting the scale beam about perpendicular axes respectively parallel to said direction of travel of the conveyor and transverse thereto, and counterweight means connected to the scale beam for balancing the scale beam relative to said axis parallel to the direction of travel.

6. The combination of claim 1 wherein said readout correcting means includes means for varying the driving speed of the conveyor, and speed sensing means responsive to variations in speed of the material on the conveyor from a reference value for correctively changing the driving speed of the conveyor.

7. The combination of claim 1 wherein said readout correcting means includes an additional weighing device for sensing the weight of an unloaded portion of the conveyor, and computing means interconnecting the weighing devices for subtracting the weight of the conveyor from the weight sensed by the first mentioned weighing device.

8. In combination with a conveyor on which material travels in one direction past a weighing station at which a weighing device is loaded by the conveyor for sensing the weight of the material thereon, a pivoted scale beam, load applying means mounted on the scale beam for engagement with the conveyor, a pair of load sensing devices connected to the scale beam at laterally spaced locations relative to said direction of travel of the conveyor for producing signals in response to displacement of the scale beam, readout means connected to the load sensing devices for registering the weight of the material, test means for unloading the conveyor from the weighing device during test intervals, a pair of reference weights engageable with the scale beam, and means suspending the reference weights from the test means in substantial alignment with the load sensing devices for engagement with the scale beam during said test intervals.

9. The combination of claim 8 wherein said test means comprises an idler beam, and means pivotally mounting the idler beam about an axis transverse to said direction of travel of the conveyor underlying the load applying means of the weighing device.

10. The combination of claim 9 including means pivotally mounting the scale beam about perpendicular axes respectively parallel to said direction of travel of the conveyor and transverse thereto, and counterweight means connected to the scale beam for balancing the scale beam relative to said axis parallel to the direction of travel.

11. The combination of claim 8 including means pivotally mounting the scale beam about perpendicular axes respectively parallel to said direction of travel of the conveyor and transverse thereto, and counterweight means connected to the scale beam for balancing the scale beam relative to said axis parallel to the direction of travel.

12. In combination with a conveyor on which material travels in one direction past a weighing station at which a weighing device is loaded by the conveyor, drive means connected to the conveyor for continuous movement of the material, test means intermittently rendered operative during test intervals for unloading the weighing device, a plurality of reference weights transversely spaced relative to said direction of travel, means responsive to said unloading of the weighing device during the test intervals for loading the same with said reference weights, readout means connected to the weighing device for registering loads sensed by the weighing device, and adjusting means for correcting the readout means in response to variations in weight registered during said test intervals.

13. The combination of claim 12 including sensing means connected to the conveyor for correctively varying the speed of the drive means.

14. The combination of claim 12 including correction means connected to the adjusting means for subtracting the weight of the conveyor from the weight registered by the readout means.

* * * * *

UNITED STATES PATENT OFFICE
CERTIFICATE OF CORRECTION

Patent No. 3,850,023     Dated   November 26, 1974

Inventor(s) Ralph R. McDonald

It is certified that error appears in the above-identified patent and that said Letters Patent are hereby corrected as shown below:

In the drawings, Figure 13, change reference numeral "98" to -- 96 --.

In the specification, column 3, line 38, singularize "members 80", column 4, line 12, change "102" to -- 98 --, column 4, line 34, change "84" to -- 85 --, column 5, line 13, change "a relay" to -- line --, column 5, line 45, pluralize "output", column 5, line 46, change "7 is" to -- are --, column 6, line 8, pluralize "output".

Signed and sealed this 8th day of April 1975.

(SEAL)
Attest:

RUTH C. MASON
Attesting Officer

C. MARSHALL DANN
Commissioner of Patents
and Trademarks